United States Patent [19]

Hsu

[11] 4,301,367
[45] Nov. 17, 1981

[54] RADIATION DOSIMETER

[76] Inventor: Sam S. Hsu, 77 Elmwood Rd., Wellesley, Mass. 02181

[21] Appl. No.: 114,062

[22] Filed: Jan. 21, 1980

[51] Int. Cl.³ .......................... G01T 1/22; G08B 17/12
[52] U.S. Cl. ..................................... 250/370; 340/600
[58] Field of Search ............... 250/336, 252, 370, 371, 250/378; 340/600

[56] References Cited

U.S. PATENT DOCUMENTS 3,999,071 12/1976 Siffert et al. .......................... 250/370
4,197,461 4/1980 Umbarger et al. ................... 250/370

Primary Examiner—Alfred E. Smith
Assistant Examiner—Janice A. Howell
Attorney, Agent, or Firm—Wolf, Greenfield & Sacks

[57] ABSTRACT

A portable solid-state radiation dosimeter provides either a cumulative reading or time base reading and includes means for generating an alarm condition when preset radiation levels are reached or exceeded. The dosimeter preferably employs a cadmium telluride crystal biased to provide a count signal corresponding to the level of radiation. The circuitry for processing the crystal signal includes a field effect transistor which provides pre-amplification, one or more stages of main amplification including noise threshold setting, and a frequency to voltage converter for essentially counting radiation pulses. One output from the converter may be an alarm signal that is tripped when a predetermined voltage is reached. Also, a digital reading of radiation count may be provided.

2 Claims, 2 Drawing Figures

RADIATION DOSIMETER

BACKGROUND OF THE INVENTION

The present invention relates in general to dosimeters and, more particularly, to a solid state radiation dosimeter that is preferably of the portable type employing a solid state crystal which may be used in gamma ray detection. The preferred crystal of this invention is a cadmium telluride crystal.

Some of the instruments or devices presently used for gamma ray detection are either cumbersome to use and not easily portable or do not provide a direct and easy reading or generation of an alarm condition. For example, the Geiger-Mueller tube technique employs an apparatus that is far too bulky. There are also chemical badge type detectors but these require a development phase in order to read a color change for indicating an excessive radiation level.

Accordingly, one object of the present invention is to provide an improved radiation dosimeter that overcomes the problems associated with the prior art types and which is a solid state detector that preferably employs substantially all solid state components.

Another object of the present invention is to provide a solid state radiation dosimeter that is portable, not bulky and easy to use.

A further object of the present invention is to provide an improved solid state personal pocket radiation dosimeter preferably having a digital readout.

Still another object of the present invention is to provide a solid state radiation dosimeter that is capable of operating in at least two modes including a cumulative counting mode and a resettable time base mode to provide radiation levels over a predetermined period of time.

Still a further object of the present invention is to provide a solid state radiation dosimeter that generates an alarm condition when a predetermined and settable level of radiation has been exceeded.

SUMMARY OF THE INVENTION

To accomplish the foregoing and other objects of this invention there is provided a solid state radiation dosimeter that is preferably portable. The dosimeter of this invention may be constructed in many different embodiments such as one including a digital readout and which is of pocket size, one which may provide only an audible alarm, and one which may combine both digital readout and audible or visual alarm. The dosimeter comprises a solid state crystal having the property of generating electrical pulse signals proportional to the radiation dosage received. In the case of measurement of gamma rays, the crystal essentially generates a pulse for each gamma ray received. Means are provided for biasing the crystal to facilitate this signal generation. The crystal preferably is a cadmium telluride crystal used for gamma ray detection. The biasing arrangement may include a resistive network coupled in series with the cadmium telluride crystal. Means are provided for amplifying the signal from the crystal to increase to amplitude levels. This amplification includes a pre-amplifier stage and a main amplifier stage. The output signal at the pre-amplifier stage may be on the order of tenths of a millivolt while the output signal after the main amplifier stage may be on the order of tenths of a volt. The pre-amplifier preferably comprises a field effect transistor that is probably biased and the main amplifier means preferably includes at least one stage of operational amplifier. Actually, in the disclosed embodiment a two-stage operational amplifier is employed. To minimize interference it is also preferred that a shield be provided about the crystal, the biasing network for the crystal and the pre-amplifier. The signal from the output of the amplifier stage couples to a means for counting these pulse signals. Finally, there is a means responsive to this counting so that when the count reaches a predetermined level an alarm is generated. In accordance with one feature of the present invention there may be provided a binary counter whose output couples to a conventional display such as an LED display for showing the existing count that is being registered. This counter may also be reset periodically but for display being enabled at the end of certain predetermined periods to provide a reading of radiation dosage per unit of time. The counting may also be accomplished by means of a frequency to voltage converter described in one embodiment herein. This converter includes a charge pump or the like charging circuit and a comparator with the inputs to the comparator being from the charging circuit and from a reference level which is presettable. This presettable reference level sets the desired radiation level. When this radiation level is attained, then an alarm is triggered to indicate that the preset level has been reached. At that time the subject can then take appropriate action such as by leaving the radiation area.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1:
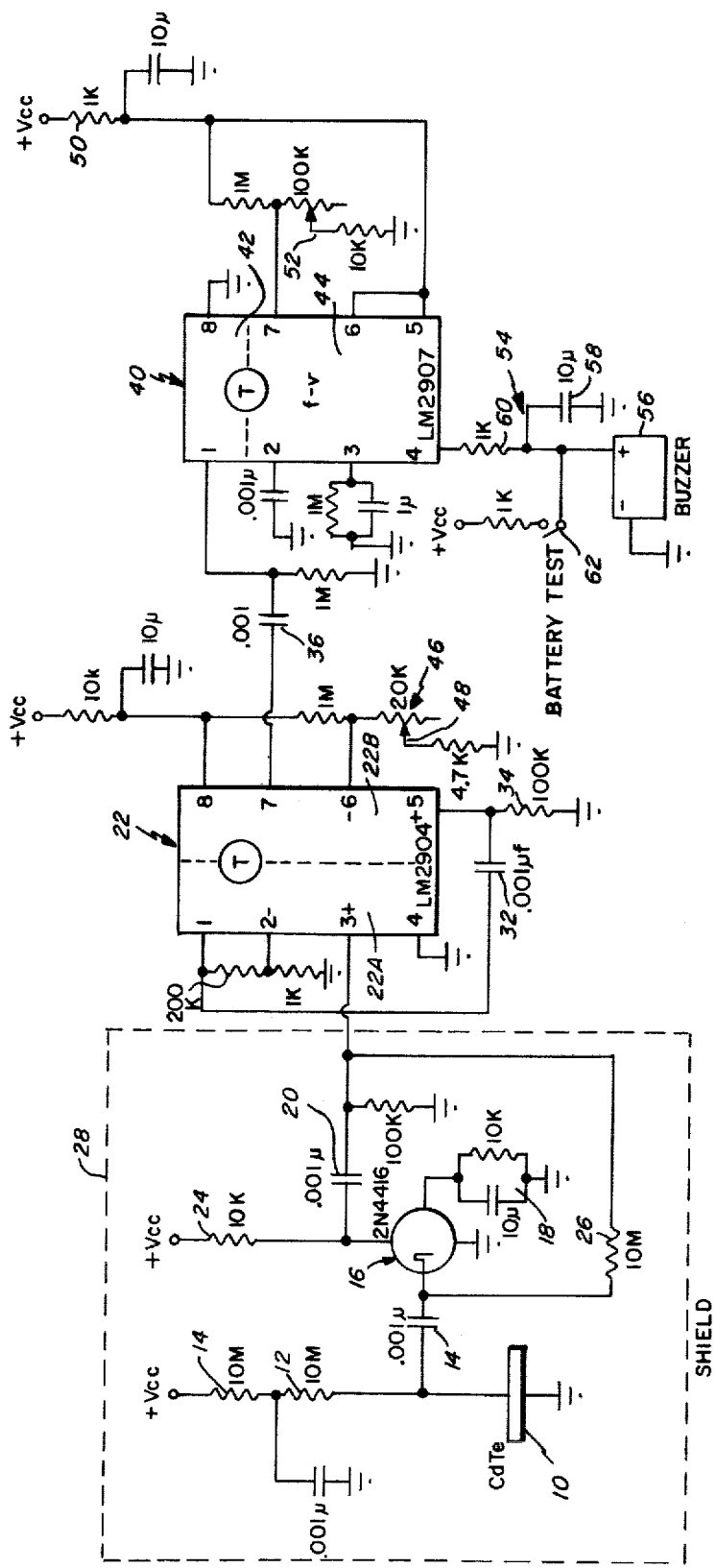
FIG. 1 is a circuit diagram showing one embodiment of the present invention, in particular disclosing the use of an audible alarm for generating an alarm condition upon the attainment of a preset radiation level.

FIG. 1 is a circuit diagram showing one embodiment for the solid state radiation dosimeter of this invention. This embodiment employs a detection transducer, a cadmium telluride crystal which has two terminals, one coupling to reference ground and the other coupling by way of resistors 12 and 14 to the $+V_{cc}$ source. The resistors 12 and 14 form a resistive biasing network for the crystal 10. Cadmium telluride crystals are commercially available and one method of production of them is shown in U.S. Pat. No. 3,771,970.

The crystal 10 AC couples by way of capacitor 14 to the gate electrode of field effect transistor 16 which may be of the type 2N4416. This is a low noise transistor. The source electrode couples by way of RC network 18 to ground reference. The output from the transistor 16 is taken at its drain electrode which couples by way of capacitor 20 to the input of operational amplifier device 22. Bias for the transistor 16 is also provided by a resistor 24 which ties from the drain electrode to the $+V_{cc}$ source. A feedback path including resistor R26 may also be provided for stability of operation. There is also preferably provided a conventional shield 28 shown in dotted outline in FIG. 1 and which encases the input section of the dosimeter including the crystal itself, the biasing network for the crystal and the field effect transistor 16. This prevents external interference with the input section of the circuitry. The operational amplifier device 22 is preferably a low powered dual operational amplifier pair such as one made by National Semiconductor identified as type LM2904. This device thus includes amplifier stages 22A and 22B. The pins 1-4 are associated with amplifier 22A and the pins 5-8 are associated with amplifier stage 22B. The two amplifier stages are tied in series thus, the signal from the field effect transistor 16 coupled by way of capacitor 20 couples to the input pin 3 of the first stage. The output from this stage is taken at pin 1 which couples by way of capacitor 2 and resistor 34 to the input pin 5 which is an input to the second stage. The output from the second stage 22B is taken at pin 7, the signal couples by way of capacitor 36 to the input of converter 40. The converter 40 includes a charged pump section 42 and a comparator section 44 discussed hereinafter.

There is a resistive network 46 including potentiometer 48 coupled between the pins 6 and 8 associated with the second stage 22B of operational amplifiers. Pin 6 represents the inverting input to the second stage and pin 8 represents a positive voltage line. Thus, the setting of potentiometer 48 controls the level of the reference input to the second stage to essentially provide a threshold setting so that any extraneous noise pulses will not pass through the second stage 22B to the device 40. This threshold setting is preferably always at least 0.1 volts. The output from pin 7 is a relatively wellshaped square but narrow pulse referenced to the $+V_{cc}$ level.

The device 40 is preferably another device made by National Semiconductor identified as their type LM2907 frequency to voltage converter. This device is a monolithic frequency to voltage converter with a high gain operational amplifier/comparator that is designed to operate a relay, lamp or other load when the input frequency reaches or exceeds a predetermined rate. This device is also referred to as a tachometer and employs a charge pump technique. As indicated previously, the device includes a charge pump section 42 and a comparator section 44. The input to the device is at pin 1 coupling by way of an input amplifier to a charge pump whose output couples internally of the device to one input of a comparator actually represented by pin 3 of the device. The pins 5 and 6 tie to a reference voltage by way of the resistor 50. The other input reference for the comparator of device 40 is at pin 7 coupled from the potentiometer 52. The potentiometer 52 essentially sets the triggering threshold of the comparator or in other words determines the frequency or number of pulses at which alarm occurs. When the comparator triggers, then there is an output at pin 4 coupled to the alarm circuit 54 which may include an audible alarm such as buzzer 56, capacitor 58 and resistor 60. This shows a battery test switch 62. When the comparator triggers there is a positive voltage signal coupled by way of the resistor 60 to the buzzer 56 for signalling the alarm condition.

The charge pump technique of the device 40 operates similarly to an integrator so that as the pulses are received by the converter 40 these are essentially counted until the circuit is sufficiently pumped (charged) to a level where there is a switching of the device causing activation of the alarm.

In FIG. 1 the normal signal level at the output of the pre-amplifier stage is on the order of tenths of a millivolt for 100 Kev gamma ray. At the output of the first stage of main amplification the pulse height may be on the order of tenths of a volt, such as 0.4 volts for 100 Kev gamma ray. The output at the final stage of amplification is referenced to the $V_{cc}$ level.

The device shown in FIG. 1 may be carried by a subject who is in a radiation area and the device over a period of time essentially integrates the conceived radiation to provide a cumulative count representative of accumulating dosage. After the subject has been subjected for a period of time, depending upon the threshold setting of potentiometer 52, then an alarm is generated when the cumulative dosage reaches the unsafe set level.

Figure 2:
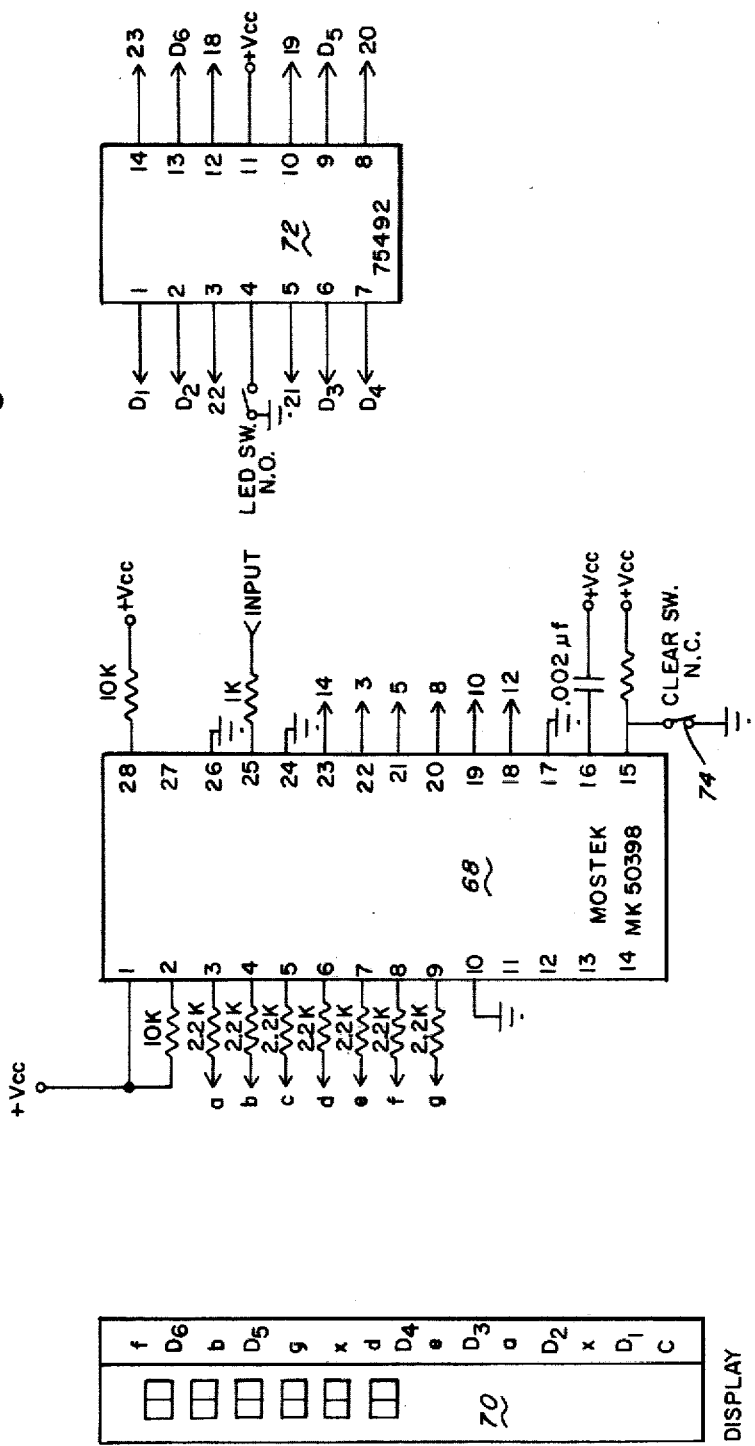
FIG. 2 is the modification of a part of the system shown in FIG. 1 employing a binary counter and associated display.

In addition to or along with, the generation of an alarm condition as depicted in FIG. 1, there may also be provided a digital reading of the cumulative count employing circuitry such as shown in the block diagram of FIG. 2. In FIG. 2 all of the interconnections are not shown but rather like terminals of the device are labeled similarly. The basic arrangement includes a counter 68, an LED array 70, and LED drivers 72. Each of these devices are of conventional design. For example, the counter 68 may be identified as their type MK50398N. The drivers may be type MC75492 made by a well-known manufacturer such as National Semiconductor. In FIG. 2 the input to the counter is at its pin 25 and this may be taken directly from the output of the second stage 22B of the amplifiers. The 7 segment outputs are taken from the counter at terminals a-g. The other data outputs from the counter/display decoder 68 couple to the driver 72. These outputs include outputs from pins 18-23 of the device 68. The data outputs D1-D6 in turn couple to similarly identify inputs of the display 70. The operation of the devices shown in FIG. 2 is conventional and is in the form of a multiplexing technique. It is also noted that there is a clear switch 74 coupled from pin 15 of the counter and it is used for clearing the counter to a zero nulled count. After each period of exposure to radiation the switch 74 may be operated to reset the display to zero count.

Having described a limited number of embodiments of the invention it is understood that other embodiments are contemplated as falling within the scope of the invention. For example, in place of a clear switch 74 there may be a clock system associated with the device for periodically clearing the counter and permitting counting over some predetermined period of time such as one second or five seconds. Under those conditions the display is blanked until the end of the count or may display a fixed count representative of a number arrived at the end of the count. The display in this case is thus a display of exposure per unit of time.

What is claimed is:
1. A solid-state radiation dosimeter comprising;
  a solid-state crystal having the property of generating electrical pulse signals proportional to particle dosage,
  a resistor network coupled to said solid-state crystal for biasing the crystal,
  transistor amplifier means,
  means coupling the crystal signal to the transistor amplifier means,
  first amplifier means coupled from said transistor amplifier means,
  second amplifier means having a signal input and reference input,
  a resistor circuit setting the reference input, conductor means coupling the output of the first amplifier means to the signal input of the second amplifier means, frequency to voltage converter means comprising a charge section and a comparator section, said comparator section having a signal input and reference input, an adjustable resistor circuit setting the reference at an adjustable triggering threshold, conductor means coupling the output of the charging section to the signal input of the comparator section, and means responsive to said comparator means for providing an alarm, said adjustable resistor circuit for determining the frequency or number of pulses at which alarm occurs.

2. A solid state radiation dosimeter as set forth in claim 1 wherein the resistor circuit setting the reference input of the second amplifier means is an adjustable resistor circuit.

* * * * *